United States Patent [19]

Johnson

[11] Patent Number: 5,680,966
[45] Date of Patent: Oct. 28, 1997

[54] SQUEEZE DISPENSER HAVING REFILL CARTRIDGE

[75] Inventor: Robin L. Johnson, Akron, Ohio

[73] Assignee: Reflex Packaging Group, Cincinnati, Ohio

[21] Appl. No.: 422,427

[22] Filed: Apr. 14, 1995

Related U.S. Application Data

[63] Continuation-in-part of Ser. No. 223,679, Apr. 6, 1994, abandoned.

[51] Int. Cl.⁶ ..................................................... G01F 13/00
[52] U.S. Cl. ........................... 222/209; 222/386.5; 222/389
[58] Field of Search .............................. 222/95, 105, 209, 222/214, 325, 356.5, 401, 389

[56] References Cited

U.S. PATENT DOCUMENTS

| | | | |
|---|---|---|---|
| 2,608,320 | 8/1952 | Harrison, Jr. | 222/95 |
| 3,223,289 | 12/1965 | Bouet | 222/209 |
| 3,341,083 | 9/1967 | Stewart | 222/209 |
| 4,098,434 | 7/1978 | Uhlig | 222/95 |
| 4,147,278 | 4/1979 | Uhlig | 222/94 |
| 4,763,818 | 8/1988 | Stefano et al. | 222/209 |
| 4,842,165 | 6/1989 | Van Coney | 222/95 |
| 5,012,956 | 5/1991 | Stoody | 222/94 |
| 5,115,948 | 5/1992 | Johnson | 222/209 |
| 5,215,229 | 6/1993 | Johnson | 222/209 |
| 5,417,847 | 5/1995 | de La Forcade | 222/95 |

FOREIGN PATENT DOCUMENTS 548840   6/1993   European Pat. Off. .

*Primary Examiner*—Andres Kashnikow
*Assistant Examiner*—Lisa Ann Douglas
*Attorney, Agent, or Firm*—Wood, Herron & Evans, L.L.

[57] ABSTRACT

A squeeze dispenser for dispensing viscous liquid products such as pastes, jells and lotions. The dispenser includes a hollow housing, a pump mechanism in the form of a flexible hollow squeeze member attached along one side of the housing, and a product cartridge which is insertable into and removable from the housing. A substantially air tight seal is created between the product cartridge and the housing such that the interior of the housing forms a pressure chamber. A lower end of the product cartridge takes the form of a flexible plastic bag which holds the product. Two one-way valves are incorporated into the dispenser. One of these valves allows one-way flow of air from atmosphere into the flexible hollow squeeze member while the other of these check valves allows one way flow of air from the flexible hollow squeeze member into the pressure chamber of the housing.

27 Claims, 2 Drawing Sheets

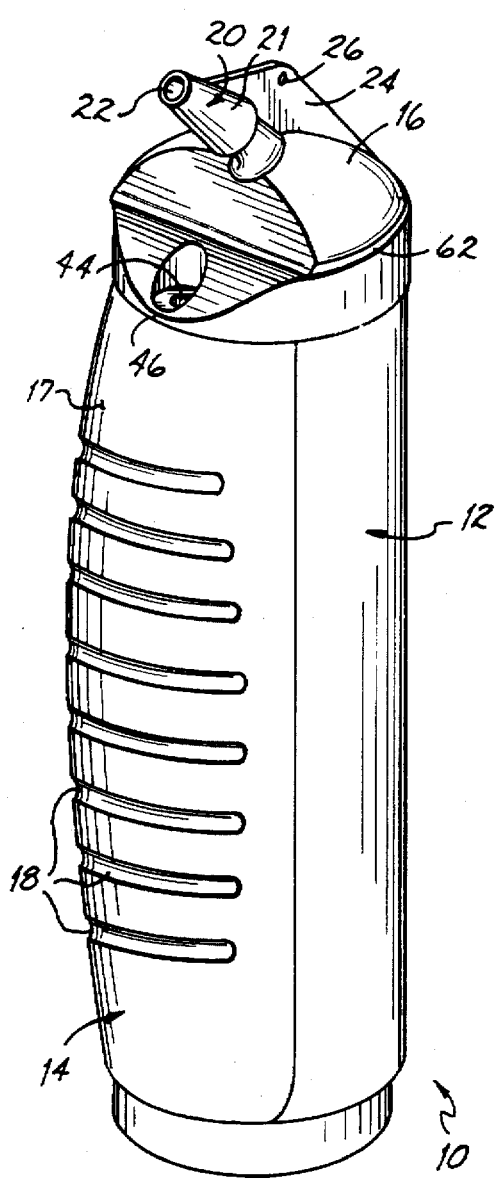
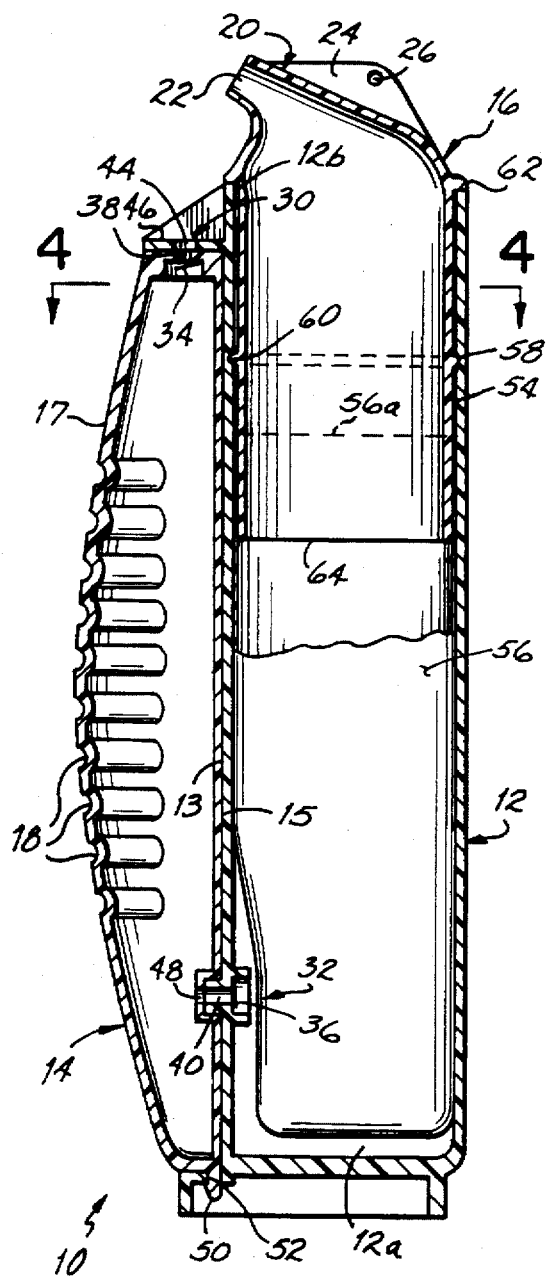
FIG. 1
FIG. 2

SQUEEZE DISPENSER HAVING REFILL CARTRIDGE

This is a continuation-in-part application of Ser. No. 08/223,679 filed Apr. 6, 1994 now abandoned.

BACKGROUND OF THE INVENTION

The present invention generally relates to a squeeze dispenser for dispensing viscous liquids and, more specifically, to a dispenser particularly suitable for dispensing liquids such as pastes, jells and lotions for consumer or commercial purposes.

Dispensers for dispensing small quantities of pastes, jells, lotions and the like are numerous in the prior art, but have various drawbacks and limitations. Many of these dispensers are not designed to be reused or refilled, and if designed to be refilled are rather inconveniently designed for such purpose. For example, a typical refillable dispenser requires the consumer to buy a large container of the product from which to refill the smaller dispenser. Among the disadvantages of this typical arrangement are the stocking of the large refill containers and the frequent difficulty of filling a small dispenser from a large refill container. Because of the inconvenience and mess associated with refilling such dispensers, for example, many consumers forego refilling them at all and instead simply buy new dispensers filled with product. The empty dispensers are generally discarded instead of being reused which results in higher costs and greater environmental waste.

Another limitation of past and current viscous liquid dispensers concerns the generally inability of such dispensers to maintain the product in close proximity to the outlet orifice of the dispensers between dispensing operations. That is, many dispensers of pastes, jells and lotions generally cannot maintain sufficient pressure on the product from within the dispenser such that the product is maintained at the outlet orifice between one dispensing operation and the next. Instead, the product tends to draw back into the dispenser and repeated pumping actions are required by the user to "prime" the pump mechanism of the dispenser and then to move product to the outlet orifice. This presents an annoying inconvenience to the user.

Many viscous liquid dispensing devices also utilize relatively large numbers of components, such as caps, springs, tubes, etc., which lead to a significant increase in the cost of manufacture. This high cost is only exasperated by the fact that the dispensers are usually thrown away after the product is depleted from the dispenser. As one result, the cost of the dispenser over the useful life thereof is relatively high.

Finally, another problem associated with many pump type dispensers concerns their reliance on a finger operated pump mechanism. These mechanisms normally extend from the top of the dispenser and are designed to be pushed down by a user's forefinger and then spring returned to their original position. Disadvantages of this type of mechanism include discomfort experienced by some users due to the concentration of pressure on only one finger and the inherent difficultly of using at least some of these dispensers while they are held in one hand.

It would therefore be desirable to provide a squeeze dispenser which may be quickly and cost efficiently refilled by the user and then comfortably actuated by the user. It would also be desirable to provide such a dispenser having relatively few components of manufacture and one which maintains a viscous liquid product at or at least within close proximity of the outlet orifice between dispensing operations.

SUMMARY OF THE INVENTION

It has therefore been one object of the present invention to provide a squeeze dispenser apparatus which reduces both environmental waste and cost.

It has been another object of the present invention to provide a squeeze dispenser which may be easily assembled with only a few components.

It has been a further object of the invention to provide a squeeze dispenser with easily replaceable and positively oriented refill cartridge.

It has been still a further object of the present invention to provide a squeeze dispenser which maintains product in close proximity to the outlet orifice between dispensing operations.

It has been still another object of the present invention to eliminate or significantly reduce the necessity of priming the pump mechanism of the dispenser prior to product actually being dispensed therefrom.

It has been still another object of the present invention to provide a squeeze dispenser having a unique ergonomic shape which easily conforms to the user's hand and which allows pressure to be applied with substantially the entire hand of a user instead of pressure from only one finger.

To these ends, the present invention is embodied in a squeeze dispenser apparatus generally comprising three major components and adapted to dispense viscous liquid products such as pastes, jells and lotions. The first of these components is a generally rigid and hollow housing. The second component comprises a pump mechanism in the form of a flexible hollow squeeze member attached along one side of the housing and which includes the dispensing orifice of the apparatus. The third major component comprises a product cartridge which is insertable into and removable from the housing and which includes the dispensing orifice of the apparatus. At least a substantially air tight seal is created between the product cartridge and the housing such that the interior of the housing forms a pressure chamber. A lower end of the product cartridge takes the form of a deformable product container which is preferably a flexible plastic bag. Two one-way valves are incorporated into the dispenser in accordance with the principles of the present invention. One of these valves allows one-way flow of air from atmosphere into the flexible hollow squeeze member while the other of these check valves allows one way flow of air from the flexible hollow squeeze member into the pressure chamber of the housing.

When the squeeze member or pump is squeezed inwardly, air is forced from inside the squeeze member into the pressure chamber of the housing through the one way valve connected therebetween. At the same time, the one way valve connected between the flexible hollow squeeze member and atmosphere is forced closed so that air cannot escape to atmosphere. Air forced into the pressure chamber of the housing compresses the flexible bag holding the product and forces product from the orifice of the dispenser. When the squeeze member is released, the two one-way valves each reverse their operations. That is, the valve between the squeeze member and the housing is forced closed by the pressure within the housing and valve between the squeeze member and atmosphere is forced open to allow air into the squeeze member from atmosphere to prepare the dispenser for the next dispensing operation. The pressure remaining in the sealed pressure chamber of the housing maintains the compression of the flexible bag holding the product and thereby maintains product in close proximity to the outlet orifice.

In a first preferred embodiment of the invention, the flexible hollow squeeze member and housing are formed as separate but connectable components. In a second embodiment of the invention, the flexible hollow squeeze member and housing are generally formed as one integral unit. The housing is preferably a much more rigid material than the flexible hollow squeeze member. Therefore, it is presently contemplated that the two piece construction will be much easier to manufacture.

In each embodiment, the housing, the squeeze member and an upper portion of the product cartridge all have a flat side and a curved side cooperating in a unique arrangement having various advantages. In the preferred embodiment, each of these major components generally have "D"-shaped cross sections. The flat sides of the cartridge and the housing provide cooperating orienting surfaces for assuring that the cartridge may only be inserted in a predetermined orientation. In the first embodiment, the flat sides of the housing and the squeeze member abut one another. With the second integral embodiment there may be only one common flat wall between the housing and squeeze member. In each embodiment, the shapes of these two components allows easy incorporation of the valve between the squeeze member and the housing. It also presents an overall rounded or generally circular cross sectional shape for the dispenser which is easily gripped and held by the user and comfortably actuated by way of a squeezing or pumping action of the user's entire hand. Finally, as mentioned above, the complementary designs of the product cartridge and housing allow the product cartridge to be easily inserted into the housing only in a predetermined orientation which is preferably one directed toward the squeeze member.

A third embodiment of the invention involves a multiple product dispensing alternative wherein the product cartridge includes a lower bag portion having at least two distinct product compartments. These compartments are open at their upper ends within an upper rigid section of the cartridge and each communicates with the outlet orifice such that the different products within each compartment mix as they are dispensed from the outlet orifice. The outlet orifice preferably contains static mixing elements for mixing the two or more products just before they are dispensed from the outlet orifice.

Further objects and advantages of the present invention will become more readily apparent to those of ordinary skill in the art upon further review of the following detailed description of the preferred embodiments of the invention taken in conjunction with the accompanying drawings.

BRIEF DESCRIPTION OF THE DRAWINGS

FIG. 1 is a perspective view of a squeeze dispenser constructed in accordance with a first preferred embodiment of the present invention;

FIG. 2 is a cross sectional elevation of the dispenser shown in FIG. 1 and taken along line 2—2;

DETAILED DESCRIPTION OF THE PREFERRED EMBODIMENTS

Figure 3:
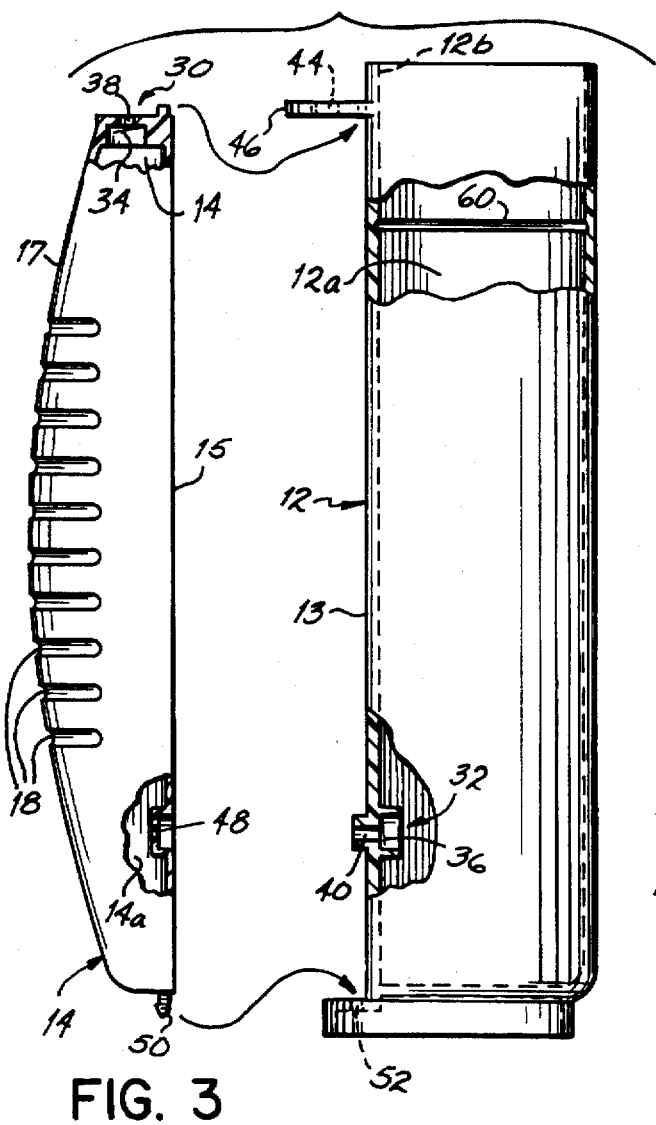
FIG. 3 is a side elevational view partially fragmented and showing the housing and flexible squeeze member of FIG. 1 in a disassembled condition.

Referring first to FIG. 1, a squeeze dispenser 10 constructed in accordance with a first preferred embodiment of this invention generally comprises a rigid, hollow housing 12, a flexible hollow squeeze member 14, and an insertable and removable product cartridge 16. Flexible squeeze member 14 preferably includes several transverse indentations 18 which allow a user's fingers to more easily grip and squeeze member 14. Product cartridge 16 will be discussed in more detail below, but as evident from FIG. 1, cartridge 16 includes an outlet nozzle 20 having an optional extension 21 and an outlet or discharge orifice 22 from which product is dispensed upon squeezing of member 14. It will be noted that extension 21 has been removed from FIGS. 2 and 5 for simplicity. Optionally, cartridge 16 may include an upper tab member 24 including a hole 26 for allowing dispenser 10 to be hung for storage or display purposes.

Referring now more specifically to FIGS. 2 and 3, two check valves or one-way valves generally indicated at 30 and 32 are provided on dispenser 10 to allow dispenser 10 to operate in the advantageous manner to be discussed below. Valve 30 is schematically shown as a one way valve comprising a hinged valve member 34 which allows one-way flow of air from atmosphere into the hollow interior 14a of flexible squeeze member 14. Specifically, valve 30 controls the flow of air through aligned apertures 38, 44 respectively contained in an upper end of squeeze member 14 and a tab member 46 of housing 12 which is used to retain squeeze member 14 in place on housing 12. A second one-way check valve 32 allows one-way flow of air from hollow squeeze member interior 14a into a hollow interior chamber 12a of housing 12. Valve 32 is also schematically shown as a hinged valve member 36 which opens and closes relative to apertures 40, 48 respectively contained in a flat side 13 of housing 12 and in an abutting flat side 15 of flexible squeeze member 14. As mentioned above, tab member 46 retains the upper end of flexible squeeze member 14 in place such that apertures 38 and 44 are aligned as shown. The lower end of squeeze member 14 includes a small flange 50 which is retained in an opening 52 at the base of housing 12.

Any suitable method of retaining flexible squeeze member 14 along side housing 12 would be suitable for the purposes of the present invention as long as air paths are provided analogous to those provided by apertures 38, 44 and 40, 48. Also, although one-way hinged type one way valves are schematically shown in the drawings for purposes of clarity, it is presently preferred to use one-way anti-backflow valves such as those which may be obtained from Buron Division of B. Braun Medical Company located in Bethlehem, Pa., and sold under part number S 5400900.

Still referring to FIG. 2, removable product cartridge 16 further includes an upper hollow rigid section 54 and a lower deformable product storage section 56 which preferably takes the form of a flexible bag. Bag 56 may, for example, be formed from plastics material such as polyethylene or cellophane or any other like flexible plastic sheet material which is capable of readily deforming and preferably inverting upon itself when pressure is applied thereto. Cartridge 16 is readily insertable into an upper opening 12b of housing 12 and seals interior 12a to form an internal pressure chamber. To provide an effective, at least substantially air-tight seal between rigid section 54 of product cartridge 16 and housing 12, a cooperating circumferential sealing structure is provided on both housing 12 and rigid section 54 of product cartridge 16. Specifically, a sealing member or ridge 58 extends outwardly from rigid hollow section 54 and, when product cartridge 16 is fully inserted into housing 12, ridge 58 registers with a correspondingly sized inner annular groove 60 contained in the interior surface of housing 12. Ridge 58 and groove 60 are sized to register together with a tight frictional fit but one which still allows a user to readily pull cartridge 16 out of housing 12 when dispenser 10 is in need of a replacement cartridge 16. It will be appreciated that an opposite arrangement of a groove on rigid section 54 and a ridge on the inner wall of housing 12 may be used as one alternative. It will also be appreciated that other types of seals may be provided between cartridge 16 and housing 12, however, the sealing ridge and groove structure disclosed herein is currently contemplated to be the most advantageous. As an alternative to the integral ridge 58, for example, ridge 58 may comprise a separate O-ring seal. To provide effective sealing, the material used for upper rigid section 54, or at least circumferential ridge 58, is chosen to be more flexible or resilient than the material used for housing 12. For example, housing 12 may be formed of polyvinylchloride while upper rigid section 54 and circumferential ridge 58 may be formed from polyethylene. A circumferential stop 62 extends outwardly from upper rigid section 54 and acts as a stop for halting the movement of cartridge 16 into housing 12 at a position in which circumferential ridge 58 registers within groove 60. Finally, as further shown in FIG. 2, upper rigid section 54 includes a lower open end 64 through which product from bag 56 flows as it is being dispensed through outlet 20. Bag 56 extends upwardly such that it receives a lower end of upper rigid section 54 as indicated by upper edge 56a of bag 56. The upper end of bag 56 is bonded in some suitable manner, such as by adhesives, to the upper rigid section 54 of cartridge 16.

Figure 4:
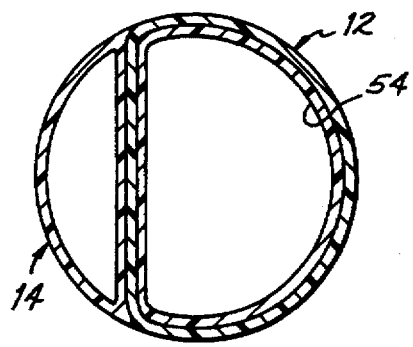
FIG. 4 is a cross sectional view of the dispenser taken along line 4—4 of FIG. 2.

Referring now briefly to FIG. 4, it will be appreciated that housing 12 has a generally "D"-shaped cross section as does flexible hollow squeeze member 14. The overall cross sectional shape of dispenser 10 is therefore rounded or generally circular. As also shown in FIG. 4, upper rigid section 54 of cartridge 16 has a "D"-shaped cross section corresponding to but slightly smaller than the internal "D"-shaped cross section of housing 12. Thus, cartridge 16 may be easily slipped into housing 12 with ridge 58 snapping into sealing engagement in groove 60 and with outlet nozzle 20 assured of being in the correct orientation with respect to flexible squeeze member or pump 14 (see FIG. 2). As further shown in FIGS. 2 and 3, flexible squeeze member 14 has an outer surface 17 which curves slightly outwardly toward a central portion from upper and lower ends thereof. The overall shape of dispenser 10 when flexible squeeze member 14 is connected to housing 12 easily conforms to a user's hand with the palm of the user's hand enveloping the curved outer surface of housing 12 and the user's fingers extending around onto outer surface 17 of flexible squeeze member 14.

Figure 5:
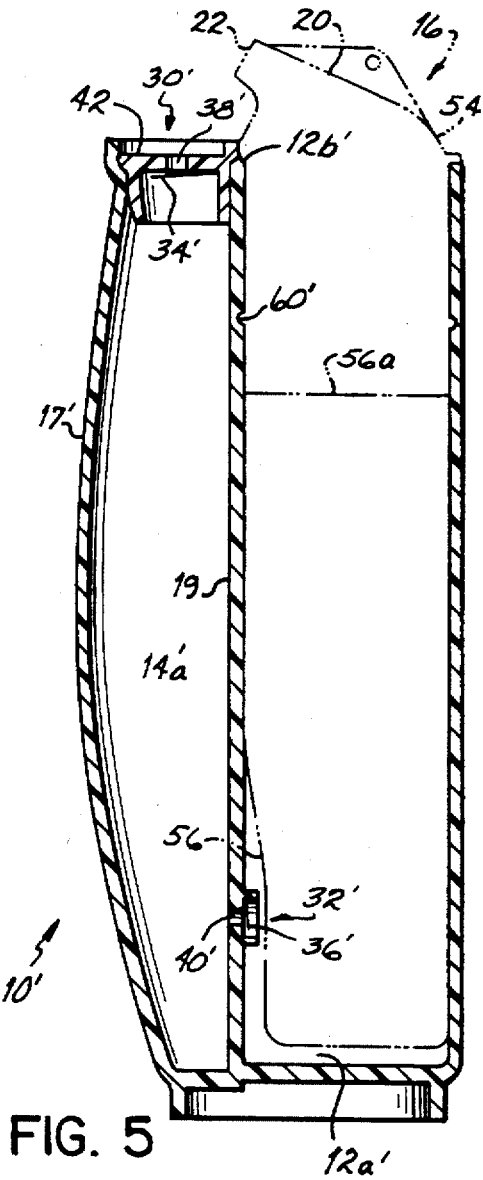
FIG. 5 is a cross sectional, partially fragmented view of a dispenser constructed in accordance with a second embodiment of the invention.

FIG. 5 illustrates a second embodiment of the present invention with like numbers representing like elements between the two embodiments and numbers having prime marks indicating elements modified in one way or another in accordance with the second embodiment. Specifically, dispenser 10' includes a housing 12' and a flexible hollow squeeze member or pump 14' integrally connected together by way of a common flat wall 19. Dispenser 10' includes a replaceable product cartridge 16 having an outlet nozzle 20 and outlet orifice 22 as well as the other identical structure shown and described hereinbefore with respect to FIG. 2. As cartridge 16 has already been fully described herein, a repeat discussion thereof is not necessary.

As with the first embodiment, dispenser 10' further includes two one way valves 30', 32' which are identical in function to valves 30, 32 previously described. Also, although hinged valve members 34', 36' are shown in FIG. 5, it will be appreciated that the identical valves disclosed with respect to the first embodiment may also be used in this second embodiment. One way valve 30' controls flow of air from atmosphere through aperture 38' and into hollow interior 14a' while one way valve 32' controls the flow of air through aperture 40' contained in common flat wall 19. Valve 30' may be contained on or within an insert 42 which closes and seals the top of flexible squeeze member 14'.

Figure 6:
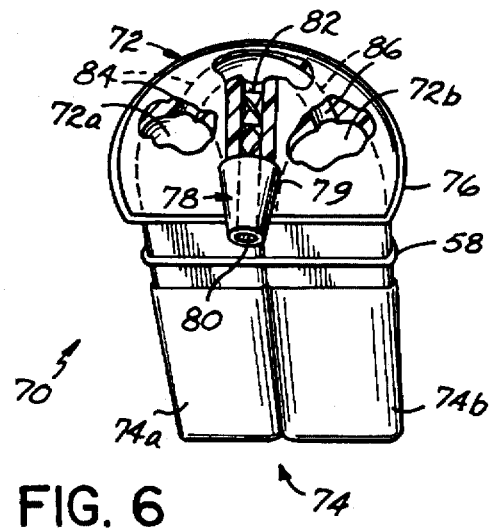
FIG. 6 is a top perspective view of a product cartridge constructed in accordance with an alternative embodiment of the invention particularly suitable for dispensing two different liquid products.

FIG. 6 illustrates an alternative embodiment for the replaceable cartridge of the present invention. Specifically, a dual dispensing cartridge 70 is shown and, similar to the first embodiment, cartridge 70 generally includes an upper rigid section 72 and a lower flexible bag section 74. The only difference between these two sections 72, 74 as compared to the first embodiment is that each is formed with two separate product compartments 72a, 72b and 74a, 74b. Compartment 72a of upper section 72 is only in communication with compartment 74a of dual bag section 74 while compartment 72b is only in communication with lower bag section 74b.

Identical to the first embodiment, upper rigid section 72 includes a circumferential sealing ridge 76 designed to be in sealing registration with groove 60 or 60' of housing 12 or 12' (see FIGS. 2 and 5). Upper rigid section further includes an outlet nozzle 78 having an optional extension 79 and an outlet orifice 80. Outlet nozzle 78 preferably contains any suitable type of static mixing elements, such as elements 82 shown in FIG. 6. Passages 84, 86 lead from the respective compartments 72a, 72b of upper section 72 to outlet nozzle 78. Thus, when cartridge 70 has been inserted into a housing 12 or 12' (FIGS. 2 and 6) and dispenser 10 or 10' is pumped, bag 74 will compress under air pressure and force product from both compartments 74a and 74b of bag 74 into compartments 72a, 72b. From there, product is forced through respective passages 84, 86 and finally into nozzle 78 whereupon the two products will be mixed by static mixing elements 82 and dispensed from outlet orifice 80.

OPERATION

The operation of the invention will now be described with respect to the first embodiment thereof shown in FIG. 2, with the understanding that the alternative embodiment shown in FIG. 5 operates in the same manner. Also, given the description of the alternative cartridge 70 described with respect to FIG. 6, it will be appreciated that dispensers 10 or 10' will operate in the same way regardless of which of the two alternative two cartridges 16 or 70 are inserted into housings 12 or 12'.

After dispenser 10 has been grasped by the user, flexible squeeze member 14 is compressed by the user's fingers while housing 12 is supported by the palm of the user's hand. Inward deformation or pumping of hollow flexible squeeze member 14 forces air within hollow interior 14a through valve 32 and into interior pressure chamber 12a of housing 12. At the same time, valve 30 at the upper end of squeeze member 14 is forced closed such that air is only directed through lower valve 32 into housing 12. Air pressure within pressure chamber 12a compresses flexible bag 56 and forces product upwardly into upper section 54 through outlet nozzle 20 and outlet orifice 22. Repeating pumping of member 14 will dispense product until bag 56 eventually collapses or inverts upon itself into upper section 54.

During pumping of member 14, release of flexible squeeze member 14 to its original outwardly curved shape shown in FIG. 2 will force one way valve 32 to close under the back pressure within chamber 12a of housing 12. Simultaneously, one way valve 30 will be forced open such that air pressure is equalized between atmosphere and the interior 14a of squeeze member 14 and interior volume 14a is refilled with air entering through valve 30. As pressure within housing 12 is maintained on one way valve 32 to keep it in a closed position until the next time that flexible squeeze member 14 is pumped inwardly toward housing 12, this pressure is also maintained on bag 56 to keep bag 56 deformed or compressed and maintain product in close proximity to outlet orifice 22. Therefore, it will be appreciated that little or no "priming" is necessary the next time the user wants to dispense product since, immediately upon again compressing squeeze member 14, bag 56 will be even further deformed or compressed and product, which is located in close proximity to orifice 22 will be immediately forced from outlet nozzle 20.

Although detailed descriptions of preferred embodiments incorporating the principles of the present invention have been described above, numerous modifications and substitutions of various elements may be readily accomplished without departing from the spirit and scope of the invention. Therefore, applicant does not intend to be bound by the details provided herein but only by the appended claims.

What is claimed is:

1. A squeeze dispenser comprising:
    a housing having a hollow interior;
    a flexible squeeze member having a hollow interior and disposed on one side of said housing;
    a first valve connected between said squeeze member and atmosphere, said first valve allowing one way flow of air from atmosphere into said squeeze member but substantially preventing flow of air out of said squeeze member;
    a second valve connected between said squeeze member and the interior pressure chamber of said housing and allowing one way flow of air from said squeeze member into said interior pressure chamber but substantially preventing flow of air out of said interior pressure chamber;
    a replaceable liquid product cartridge insertable within said housing and comprising an upper section including a dispensing orifice and a lower section, said upper and lower sections being in fluid communication and thereby defining a liquid product flow path between said lower section, said upper section and said dispensing orifice, said lower section being a liquid product storage section capable of deforming under air pressure from said squeeze member, and said upper section and said housing having mating seal structure for forming a substantially air tight seal therebetween and forming said hollow interior of said housing into a pressure chamber;
    wherein said product cartridge includes a tubular shaped rigid portion not capable of being deformed under air pressure during use and located below said dispensing orifice, said tubular shaped portion being insertable into and removable from an upper opening of said housing.

2. The dispenser of claim 1 wherein said lower section further comprises a flexible bag formed from plastic sheet material.

3. The dispenser of claim 1 wherein said housing and said squeeze member are each elongated members having generally "D"-shaped cross sections and abutting to form an overall rounded cross sectional shape.

4. The dispenser of claim 3 wherein said squeeze member curves outwardly toward a central portion from upper and lower ends thereof.

5. The dispenser of claim 3 wherein said second valve is mounted within a wall extending between the hollow interior of said squeeze member and the interior pressure chamber of said housing.

6. The dispenser of claim 1 wherein said housing and said squeeze member are each elongated members having generally "D"-shaped cross sections and abutting to form an overall rounded cross sectional shape and wherein said tubular shaped rigid portion of said product cartridge has a generally "D"-shaped cross section corresponding to the generally "D"-shaped cross section of said housing.

7. The dispenser of claim 6 wherein said squeeze member curves outwardly toward a central portion from upper and lower ends thereof.

8. The dispenser of claim 6 wherein said product cartridge includes a seal member extending circumferentially around said tubular shaped portion and registrable with a frictional fit within an annular groove contained within said housing to provide a substantially air tight seal when said cartridge is inserted into said housing.

9. The dispenser of claim 8 wherein said seal member further comprises a ridge integrally formed on an outer surface of said tubular shaped portion.

10. The dispenser of claim 8 wherein said tubular shaped portion further includes a stop member for limiting insertion of said product cartridge into said housing to a point at which said seal member is disposed within said groove.

11. The dispenser of claim 1 wherein said product cartridge includes a seal member extending circumferentially around said tubular shaped portion and registrable with a frictional fit within an annular groove contained within said housing to provide a substantially air tight seal when said cartridge is inserted in said housing.

12. The dispenser of claim 11 wherein said seal member further comprises a ridge integrally formed on an outer surface of said tubular shaped portion.

13. The dispenser of claim 11 wherein said tubular shaped portion further includes a stop member for limiting insertion of said product cartridge into said housing to a point at which said seal member is disposed within said groove.

14. A squeezed dispenser comprising:
    a housing having an open end, a closed end and a hollow interior, said housing in cross-section having one flat side and an opposite curved outer surface;
    a flexible squeeze member connected to said housing and having an enclosed hollow interior, said squeeze member in cross section having one flat side and an opposite curved outer surface, wherein the flat side of said squeeze member is disposed along the flat side of said housing and the curved outer surfaces of said squeeze member and said housing combine to form an outer gripping surface of said dispenser;
    a first valve connected between said squeeze member and atmosphere and a second valve connected between said squeeze member and the hollow interior of said housing, said first and second valve operating to allow passage of air under pressure into the hollow interior of said housing upon pumping said squeeze member;
    a replaceable liquid product cartridge insertable within the open end of said housing and comprising a first section including a dispensing orifice connected for fluid communication with a liquid product storage section, said liquid product storage section capable of moving under air pressure from said squeeze member to force liquid product through said dispensing orifice, wherein said first section includes a flat orienting surface for mating with the flat side of said housing and assuring that said cartridge is inserted in a predetermined orientation within said housing;

wherein said product cartridge includes a tubular shaped rigid portion not capable of being deformed under air pressure during use and located below said dispensing orifice, said tubular shaped portion being insertable into and removable from an upper opening of said housing.

15. The squeeze dispenser of claim 14 wherein said predetermined orientation is with said orifice directed toward said squeeze member.

16. The squeeze dispenser of claim 14 wherein said housing, said squeeze member and said cartridge each have a generally "D"-shaped cross section.

17. The dispenser of claim 14 wherein the first section of said product cartridge is a tubular section which includes an outer circumferential seal member registrable with a frictional fit within an annular groove contained within said housing to provide a substantially air tight seal when said cartridge is inserted into said housing.

18. The dispenser of claim 17 wherein said seal member further comprises a ridge integrally formed on an outer surface of said tubular section.

19. The dispenser of claim 17 wherein said tubular section further includes a stop member for limiting insertion of said product cartridge into said housing to a point at which said seal member is disposed within said groove.

20. A squeeze dispenser comprising:

a housing having a hollow interior;

a flexible squeeze member having a hollow interior and disposed in fluid communication with the hollow interior of said housing;

a valve connected between said squeeze member and atmosphere, said valve allowing one way flow of air from atmosphere into said squeeze member but substantially preventing flow of air out of said squeeze member; and a replaceable liquid product cartridge insertable within said housing and comprising an upper section including a dispensing orifice and a lower section, said upper and lower sections being in fluid communication and thereby defining a liquid product flow path between said lower section, said upper section and said dispensing orifice, said lower section being a liquid product storage section capable of deforming under air pressure from said squeeze member, and said upper section and said housing having mating seal structure for forming a substantially air tight seal therebetween and forming said hollow interior of said housing into a pressure chamber;

wherein said product cartridge includes a tubular shaft rigid portion not capable of being deformed under air pressure during use and located below said dispensing orifice, said tubular shaped portion being insertable into and removable from an upper opening of said housing.

21. The dispenser of claim 20 wherein the lower section includes first and second separate liquid product storage sections each being in communication with said liquid product flow path.

22. The squeeze dispenser of claim 21 wherein said liquid product flow path further includes static mixing elements for mixing product from said first and second liquid product storage sections together during a dispensing operation.

23. The dispenser of claim 21 wherein said lower section further comprises a flexible bag formed from plastic sheet material and having two separate product compartments.

24. The dispenser of claim 21 wherein said housing and said squeeze member are each elongated members having generally "D"-shaped cross sections and abutting to form an overall rounded cross sectional shape.

25. The dispenser of claim 24 wherein said squeeze member curves outwardly toward a central portion from upper and lower ends thereof.

26. The dispenser of claim 24 wherein said second valve is mounted within a wall extending between the hollow interior of said squeeze member and the interior pressure chamber of said housing.

27. The dispenser of claim 21 wherein said product cartridge includes a tubular shaped rigid portion below said dispensing orifice, said tubular shaped portion being insertable into and removable from an upper opening of said housing.

* * * * *